Patented Apr. 14, 1942

2,279,973

UNITED STATES PATENT OFFICE 2,279,973

STABILIZATION OF ORGANIC SUBSTANCES

Melvin A. Dietrich, Claymont, Del., assignor to E. I. du Pont de Nemours & Company, Wilmington, Del., a corporation of Delaware No Drawing. Application May 8, 1940,
Serial No. 334,065

22 Claims. (Cl. 252—51)

This invention relates to the stabilization of organic substances and particularly to organic substances subject to oxidative deterioration accelerated by catalytically active metals.

Many organic substances are subject to oxidative deterioration, that is, deterioration caused by the action of air or oxygen, particularly in the presence of light and heat, whereby such organic substances tend to lose characteristics which are considered desirable and to develop others which are objectionable. Thus, rubber tends to lose its elasticity on prolonged contact with air or oxygen, gasoline forms gums which deposit in fuel lines and cause sticking of valve parts, and natural fats and oils develop objectionable odors and flavors. These changes are effected primarily through the action of oxygen but may be accelerated by the action of heat and light. This type of degradation is promoted by catalysts, such as peroxides, formed within the oxidizable substances; and is auto-catalytic in nature. Such catalysts apparently function through the mechanism of chain types of reaction which proceeds slowly in the beginning, but accelerates until a maximum rate is reached. It is well known that degradative changes of this character may be effectively reduced through the addition of small quantities of compounds of a general class commonly referred to as antioxidants. Phenols, amines, substituted guanidines, urea derivatives, and wood tar distillates are representative groups of antioxidant compounds belonging in this class.

It is also well known that certain metals, such as copper, exert a powerful influence in accelerating the oxidative degradation of such organic substances. Such catalytically active metals are not products of the substances themselves, but are extraneous materials introduced into the substances through handling, storing or through refining processes. In the presence of the catalytically active metals, the antioxidants commonly employed either fail to function or are very much less effective so that they must be employed in relatively large quantities in order to obtain effective inhibition of the deterioration. Under such circumstances, the use of antioxidants is seriously handicapped by their failure to provide adequate protection or because of prohibitively high costs. It is also well known that organic substances, which deteriorate normally at so slow a rate that the use of antioxidants therewith is not generally regarded as necessary, do deteriorate rapidly and seriously in the presence of the catalytically active metals such as copper. In the presence of such catalytically active metals, the addition of antioxidants, in amounts normally employed, has substantially no effect.

It has been discovered that there are groups of chemicals which, when added to organic substances subject to oxidative deterioration accelerated by catalytically active metals, serve to deactivate the metals and to inhibit the catalytic influence which such metals exert on oxidation processes. These groups of compounds are generically called metal deactivators and, in substances free of catalytic metals, have little or no stabilizing action, but, in substances contaminated with catalytically active metals, exert a powerful stabilizing effect.

Non-viscous petroleum hydrocarbons, such as gasoline, kerosene and gas oils, represent an important group of oxidizable substances which are subject to contamination or contact with catalytically active metals, such as copper and copper derivatives, through refining processes, transportation, storage and use in internal combustion engines. Non-viscous petroleum hydrocarbons, as employed hereinafter and in the claims, are hydrocarbons derived from petroleum and having the following characteristics:

10% distillation point—not over 480° F.
90% distillation point—not over 700° F.
End distillation point—not over 750° F.
Water and sediment not over 0.5%.
Saybolt Universal viscosity at 100° F. not over 45 secs.

Such non-viscous hydrocarbons will preferably be of low molecular weight, that is, have an average molecular weight of not over 250.

It is an object of the present invention to provide metal deactivators which will be effective to inhibit the catalytic effect of catalytically active metals to accelerate oxidative deterioration of organic substances. Another object is to inhibit oxidative deterioration of organic substances accelerated by catalytically active copper in the form of metallic copper or in the form of copper compounds. A further object is to render antioxidants effective to stabilize organic substances in the presence of catalytically active metals, which antioxidants are normally effective to stabilize the organic substances in the absence of such catalytically active metals, but which antioxidants are materially less effective to stabilize such organic substances in the presence of such catalytically active metals. A still further object is to stabilize organic substances in the presence of copper, which organic substances are not normally susceptible to stabilization through the use of antioxidants. Still another object is to stabilize non-viscous petroleum hydrocarbons against oxidative degradation accelerated by a catalytically active metal and particularly in the presence of an antioxidant, which is normally relatively ineffective in the presence of such catalytically active metals.

Other objects are to provide new compositions of matter and to advance the art. Further objects will appear hereinafter.

The above and other objects may be accomplished in accordance with my invention, which comprises incorporating in an organic substance, subject to oxidative deterioration accelerated by a catalytically active metal, a small proportion, sufficient to inhibit the catalytic effect of such metal, of a hydroxamic acid. I have found that hydroxamic acids are effective metal deactivators which will deactivate catalytically active metals, such as copper, and inhibit the catalytic effect of such metals to accelerate the oxidative deterioration of the organic substances. When the organic substance is one which normally is subject to objectionable auto-oxidation in the absence of a catalytically active metal and hence normally requires the use of an antioxidant, which is materially less effective in the presence of a catalytically active metal, and such organic substance, containing such antioxidant, is brought into contact with or, in use, is to be brought into contact with a catalytically active metal, the incorporation of a small proportion of a hydroxamic acid of my invention in the organic substance will inhibit the catalytic effect of the catalytically active metal and its effect on the antioxidant, thereby rendering the antioxidant effective in the presence of such metal. The hydroxamic acids are particularly effective and desirable for stabilizing non-viscous petroleum hydrocarbons subject to oxidative deterioration accelerated by a catalytically active metal. The hydroxamic acids of my invention are also particularly effective to inhibit the catalytic effect of catalytically active copper, either in the form of metallic copper or in the form of copper containing chemical compounds.

By hydroxamic acids, I mean compounds of the formula

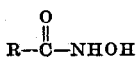

wherein R is an organic radical having a carbon atom thereof directly bonded to the carbon of the

Such hydroxamic acids may contain one or more than one hydroxamic acid group. By a hydroxamic acid group, I mean the group

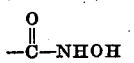

and do not intend to include thereby derivatives thereof, such as salts, esters or ethers. While any hydroxamic acid which is soluble in the material to be protected to the extent of about 0.0005 to about 0.5% will be effective for my purpose, in general I prefer to employ hydroxamic acids which are devoid of acid substituents, that is, have no acid groups, other than the hydroxamic acid groups, substituted in the radical R of the above formula. By acid substituents, I mean sulfonic acid, carboxylic acid, phosphoric acid and like groups, which would render the compound acidic in nature and which readily form salts with bases, but do not intend to include thereby alcoholic or phenolic hydroxy groups or hydroxamic acid groups.

Preferably, the hydroxamic acids contain at least 6 carbon atoms. The hydroxamic acids may be aliphatic or aromatic, that is, R may be an aliphatic or an aromatic radical. The radicals represented by R may contain ether groups, such as alkoxy or aryloxy groups, or corresponding thioether groups wherein the oxygen or the alkoxy or aryloxy group is replaced by sulfur. The radical, represented by R, may also contain primary, secondary or tertiary amino groups, hydroxy groups, nitro groups, heterocyclic groups, halogens and the like. Of the hydroxamic acids, the aliphatic and particularly the unsubstituted aliphatic hydroxamic acids will generally be preferred. By aliphatic hydroxamic acids, I mean that the carbon atom attached to the

of the hydroxamic acid groups is an aliphatic carbon of an aliphatic group, as distinguished from an aromatic carbon which is a ring carbon atom of a benzene ring. By unsubstituted aliphatic hydroxamic acid, I mean one which contains no aromatic rings. While the hydroxamic acids may have various substitutents, as above described, preferably, they will consist of the elements carbon, hydrogen, oxygen and nitrogen, and I particularly prefer those which, except for the hydroxamic acid groups, consist of carbon and hydrogen. Preferably the hydroxamic acids contain a maximum of two hydroxamic groups, that is, contain from 1 to 2 hydroxamic acid groups. The dihydroxamic acids appear to be the most efficient.

Amongst the compounds of my invention the following have been found to be particularly satisfactory:

Laurohydroxamic acid

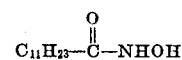

Sebacodihydroxamic acid

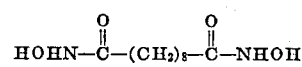

Adipodihydroxamic acid

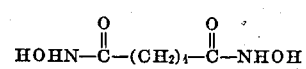

Salicylhydroxamic acid

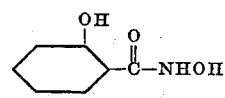

Palmitohydroxamic acid

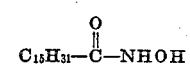

Stearohydroxamic acid

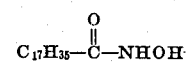

Oleohydroxamic acid

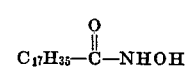

Cyclohexanone ketal of tartarodihydroxamic acid

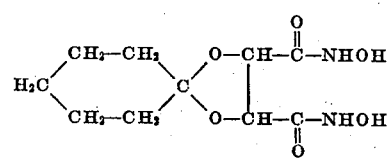

Isoamylmalonodihydroxamic acid

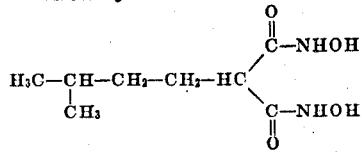

p-tert.-Amylphenoxyacetohydroxamic acid

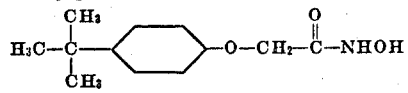

Dodecane-1-mercaptosuccinodihydroxamic acid

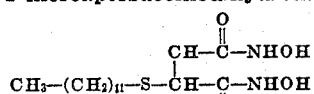

Dodecyloxyacetohydroxamic acid

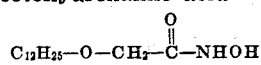

N-Dibutylaminoacetohydroxamic acid

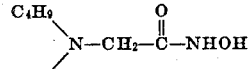

*Naphtheno-malonodihydroxamic acid

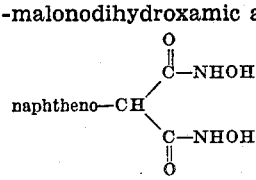

The hydroxamic acids may be incorporated in the organic substances by various methods, such as by simple mixing and heating where the solubility characteristics permit, or by grinding or passage through a colloid mill with the organic substance to be treated. If desired they may be incorporated by means of a mutual solvent or a blending agent or by other methods well known to the art. The concentration of hydroxamic acid employed will be determined primarily by the quantity of catalytically active metal in the organic substance or the area of the metallic surface with which the organic substance is in contact and by the amount of protection it is desired to obtain. In general the range of concentration of the hydroxamic acid in the organic substance will lie between about 0.0005% and about 0.5%. The preferred range will be between about 0.001% and 0.1%. Where the organic substance is in contact with solid catalytically active metal, such as a copper container, saturated solutions of the hydroxamic acid in the organic substance may be employed.

The preparation of hydroxamic acids is described in the literature and follows well known chemical methods. The preparation of a few representative compounds is given in the following examples, in which the quantities are given as parts by weight.

EXAMPLE I

*Preparation of laurohydroxamic acid*

$C_{11}H_{23}$—CO—NHOH

Twenty-seven parts of sodium methylate, contained in 155 parts of methanol solution, was poured into a solution of 35 parts by weight of hydroxylamine hydrochloride in 239 parts of methanol. The sodium chloride was removed

* This is a mixture of compounds in which "naphtheno" represents the radical of naphthenic acids obtained from petroleum, and which naphthenic acids and their derivatives are obtained as mixtures.

and 106 parts of methyl laurate was added to the filtrate. After these solutions were thoroughly mixed, an additional 155 parts of the sodium methylate solution was introduced and the mixture allowed to stand at room temperature. After standing 20 hours, the solution was acidified with dilute acetic acid to precipitate the hydroxamic acid. Recrystallization from ethyl acetate gave 98 parts of laurohydroxamic acid, melting at 95° C. Anal.: N (calculated), 6.51% N (found), 6.70%.

EXAMPLE II

*Preparation of sebacodihydroxamic acid*

HOHN—OC—$(CH_2)_8$—CO—NHOH

A reaction mixture, comprising a methanol solution of 258 parts of diethyl sebacate, 72.6 parts of hydroxylamine, and 108 parts of sodium methylate, was allowed to stand at 30° C. for two days. A stream of dry carbon dioxide gas was then passed through this solution until precipitation of sodium carbonate ceased. The solid was removed by filtration, and the methanol solvent evaporated from the filtrate. After drying, the residue comprised 175 parts of sebacodihydroxamic acid, which was a white solid melting with decomposition at 164° C. Anal.: N (found), 11.88%, N (calculated), 12.07%.

EXAMPLE III

*Preparation of adipodihydroxamic acid*

HOHN—OC—$(CH_2)_4$—CO—NHOH

A methanol solution of hydroxylamine was prepared by adding a cool solution of 75.6 parts of sodium methylate in methanol to a solution of 77 parts of hydroxylamine hydrochloride in methanol. The precipitated sodium chloride was separated by filtration and discarded. To the filtrate were added 101 parts of diethyl adipate and a solution of 54 parts of sodium methylate in methanol. This reaction mixture was allowed to stand at 30° C. for 15 hours. It was then subjected to distillation under reduced pressure until the volatile constituents were substantially removed. The white, nearly dry, solid residue remaining (sodium salt of adipodihydroxamic acid) was then dissolved in 100 parts of warm water. After cooling, this solution to 0° C., 99 parts of concentrated hydrochloric acid (specific gravity 1.19) were slowly introduced with stirring. The acidic solution was cooled to —5° C. to complete the precipitation of the product, which was separated by filtration, washed with a little cold water, and dried. By this means, there was obtained 65 parts of adipodihydroxamic acid, which is a crystalline white solid melting at 164° C. with decomposition, and which gives, with ferric chloride solution, the deep red coloration characteristic of hydroxamic acids in general.

The effectiveness of compounds of the type given above, in inhibiting oxidation, was determined in commercial blends of cracked and straight-run gasolines, completely refined but otherwise untreated with chemical agents, such as dyes, anti-knocks, and antioxidants. Since gasoline is a mixture of variable composition, identical results are not obtained with different samples.

p-Benzylaminophenol, abbreviated BAP, and copper oleate, abbreviated Cu, have been chosen as a representative gasoline antioxidant and copper catalyst, respectively. The hydroxamic acids will be referred to as deactivators.

The method, used for determining the gum inhibiting qualities, was developed by Voorhees and Eisinger (S. A. E. Journal, volume 24, 584 (1929)) and consists in shaking 100 cc. of the gasoline at 100° C. in a 1-liter Pyrex flask containing pure oxygen. The internal pressure is observed every 10 minutes by means of a manometer attached to the system. The elapsed time, from the start of the test until the gasoline begins to absorb oxygen at the rate of 10 cc. per 10 minutes, as shown by the fall in internal pressure, is taken as the induction period. It has been found that the induction period, obtained by this method. although greatly shortened, is a fairly accurate measure of the gum formation rate of gasoline under normal storage conditions. The data obtained in this test are summarized in the table.

Table

| Hydroxamic acid in gasoline | Percent by weight | Percent by weight of BAP | Percent by weight of Cu | Induction period in minutes |
|---|---|---|---|---|
| None—control test | | | | 240 |
| None | | 0.00075 | | 380 |
| Do | | 0.00075 | 0.0001 | 30 |
| Laurohydroxamic acid | 0.0025 | 0.00075 | 0.0001 | 130 |
| Do | 0.005 | 0.00075 | 0.0001 | 140 |
| Salicylhydroxamic acid | 0.0025 | 0.00075 | 0.0001 | 160 |
| None—control test | | | | 250 |
| None | | 0.001 | | 440 |
| Do | | 0.001 | 0.0001 | 30 |
| Adipodihydroxamic acid | 0.0005 | 0.001 | 0.0001 | 310 |
| Do | 0.001 | 0.001 | 0.0001 | Over 440 |
| Do | 0.002 | 0.001 | 0.0001 | Over 440 |
| Palmitohydroxamic acid | 0.005 | 0.001 | 0.0001 | 210 |
| Stearohydroxamic acid | 0.005 | 0.001 | 0.0001 | 170 |
| None—control test | | | | 220 |
| None | | 0.001 | | 370 |
| Do | | 0.001 | 0.0001 | 30 |
| Oleohydroxamic acid | 0.005 | 0.001 | 0.0001 | 210 |
| None—control test | | | | 240 |
| None | | 0.00075 | | 420 |
| Do | | 0.00075 | 0.0001 | 30 |
| Sebacodihydroxamic acid | 0.001 | 0.00075 | 0.0001 | 260 |
| Do | 0.004 | 0.00075 | 0.0001 | 270 |
| None—control test | | | | 190 |
| None | | 0.002 | | 370 |
| Do | | 0.002 | 0.0001 | 30 |
| Cyclohexanone ketal of tartarodihydroxamic acid | 0.005 | 0.002 | 0.0001 | 220 |
| Isoamylmalonodihydroxamic acid | 0.005 | 0.002 | 0.0001 | 180 |

It will be understood that the above examples and tests are given for illustrative purposes only. While in the above tests the hydroxamic acids have been employed in conjunction with a known antioxidant whose efficiency is seriously impaired by the presence of traces of catalytically active metals, such as copper, the hydroxamic acids may be employed in conjunction with other antioxidants, such as, for example, p-butylaminophenol, p-isobutylaminophenol, dianiline salt of hydroquinone, p - phenylenediamine, N,N' - dibutyl-p-phenylenediamine, tributylamine, wood tar acids, C-isopropyl-N-dimethylaminophenol, phenol ethers, indophenol dyes, cyclohexylpyrogallol, cyclohexyl-alpha-naphthylamine, and dimethyl maleate. They may be employed in conjunction with anti-knock agents, such as lead tetraethyl and materials employed for gum-fluxing purposes. They may be incorporated into the gasoline during refining processes or at any time thereafter.

While the above tests have been restricted to gasoline, I have found the hydroxamic acids to be effective in preventing rancidity in vegetable fats and oils, such as olive oil and cottonseed oil, in animal fats and oils, such as tallow, butter and lard, in vitamins and in soaps when these materials were stored in the presence of small amounts of catalytically active metal, such as copper, both in the presence of and in the absence of antioxidants, such as thymol and methyl syringate. I have also found them to be useful in preventing deterioration of organic insulating materials, such as the formaldehyde acetal of polyvinyl alcohol and chlorine-containing vinyl polymers, used in covering copper or copper-containing articles and wires. The hydroxamic acids habe been found to impart improved stability to rubber, such as rubber compounded with known commercial antioxidants such as di-o-tolylguanidine but contaminated with a catalytically active metal, such as copper stearate. When incorporated into a linear superpolyamide, known commonly as nylon, either alone or in combination with an antioxidant, the hydroxamic acids have materially improved the stability of the superpolyamide against embrittlement through thermal and photochemical degradation and loss of insulating power when employed as a coating for copper-containing wire. They have also been found to inhibit deterioration of antioxidants accelerated by catalytically active metals, such as copper and its catalytically active compounds.

The hydroxamic acids of my invention may be employed to inhibit the deleterious catalytic effect of catalytically active metals on petroleum hydrocarbons generally, including kerosene, gas oils, fuel oils, furnace oils, Diesel fuels and lubricating oils and greases; aliphatic hydrocarbons, such as isopentane, cetane, cetene, isooctane, propane, paraffin wax and polymerized olefins; ethers, such as diisopropyl ether; refrigeration gases, such as methyl chloride and dichlorodifluoromethane; dry cleaning solvents, particularly of the hydrocarbon and halogenated hydrocarbon types; castor oil and derivatives thereof, such as are employed as hydraulic fluids; textile finishing agents; methyl methacrylate resins; polyvinyl acetates, polyvinyl acetals and the like.

As is disclosed in my copending application Serial No. 334,066 filed on even date herewith, the hydroxamic acids, when incorporated in viscous hydrocarbon oils, stabilize such oils even in the absence of catalytically active metals and increase the film strength of lubricating oils.

Hydroxamic acids, other than those hereinbefore mentioned, may also be used, such as Ethoxyacetohydroxamic acid
Hexahydroterephthalodihydroxamic acid
Beta-tert-amyladipodihydroxamic acid
Naphthenohydroxamic acids (mixed)
Naphthalodihydroxamic acid
Phenylaminoacetohydroxamic acid
Acetohydroxamic acid
Butyrohydroxamic acid
Butylmercaptoacetohydroxamic acid
p-Toluohydroxamic acid
p-Amylbenzohydroxamic acid
Cyclohexylmercaptosuccinodihydroxamic acid
Beta-phenyladipodihydroxamic acid
Meta-phenylenedioxyacetohydroxamic acid
8(9)-para-hydroxyphenylstearohydroxamic acid
Beta-naphthyloxyacetohydroxamic acid
o-Methoxybenzohydroxamic acid Mixtures of two or more of such hydroxamic acids may be employed. Also mixtures of hydroxamic acids, such as those derived from mixed acids obtained by saponification of vegetable or animal oils, from mixed acids obtained by oxidation of paraffin wax, and from mixed acids obtained by oxidation of alcohols produced during the hydrogenation of carbon oxides. Still other mixtures of hydroxamic acids may be prepared from the mixtures of naphthenic acids derived from petroleum.

Still other variations and modifications of my invention, particularly in the compounds employed, the substances treated, and the method of treatment will be readily apparent to those skilled in the art. Accordingly, I intend to claim my invention broadly as in the appended claims.

I claim:

1. An organic substance of the group consisting of vegetable fats and oils, animal fats and oils, vitamins, soaps, rubber, linear super-polyamides, petroleum hydrocarbons, polymerized olefins, ethers, refrigeration gases, dry-cleaning solvents, castor oil and its derivatives, methyl methacrylate resins and antioxidants, subject to oxidative deterioration accelerated by a catalytically active metal, having incorporated therein a small proportion, sufficient to inhibit the catalytic effect of the metal, of a hydroxamic acid.

2. An organic substance of the group consisting of vegetable fats and oils, animal fats and oils, vitamins, soaps, rubber, linear super-polyamides, petroleum hydrocarbons, polymerized olefins, ethers, refrigeration gases, dry-cleaning solvents, castor oil and its derivatives, methyl methacrylate resins and antioxidants, subject to oxidative deterioration accelerated by a catalytically active metal, having incorporated therein a small proportion, sufficient to inhibit the catalytic effect of the metal, of a hydroxamic acid devoid of acid substituents and which consists of the elements carbon, hydrogen, oxygen and nitrogen.

3. An organic substance of the group consisting of vegetable fats and oils, animal fats and oils, vitamins, soaps, rubber, linear super-polyamides, petroleum hydrocarbons, polymerized olefins, ethers, refrigeration gases, dry-cleaning solvents, castor oil and its derivatives, methyl methacrylate resins and antioxidants, subject to oxidative deterioration accelerated by a catalytically active metal, having incorporated therein a small portion, sufficient to inhibit the catalytic effect of the metal, of an aliphatic hydroxamic acid devoid of acid substituents and which consists of the elements carbon, hydrogen, oxygen and nitrogen.

4. An organic substance of the group consisting of vegetable fats and oils, animal fats and oils, vitamins, soaps, rubber, linear super-polyamides, petroleum hydrocarbons, polymerized olefins, ethers, refrigeration gases, dry-cleaning solvents, castor oil and its derivatives, methyl methacrylate resins and antioxidants, subject to oxidative deterioration accelerated by a catalytically active metal, having incorporated therein a small proportion, sufficient to inhibit the catalytic effect of the metal, of a hydroxamic acid which, except for 1 to 2 hydroxamic acid groups, consists of the elements carbon and hydrogen.

5. An organic substance of the group consisting of vegetable fats and oils, animal fats and oils, vitamins, soaps, rubber, linear super-polyamides, petroleum hydrocarbons, polymerized olefins, ethers, refrigeration gases, dry-cleaning solvents, castor oil and its derivatives, methyl methacrylate resins and antioxidants, subject to oxidative deterioration accelerated by a catalytically active metal, having incorporated therein a small proportion, sufficient to inhibit the catalytic effect of the metal, of an aliphatic hydroxamic acid which, except for 1 to 2 hydroxamic acid groups, consists of the elements carbon and hydrogen.

6. An organic substance of the group consisting of vegetable fats and oils, animal fats and oils, vitamins, soaps, rubber, linear super-polyamides, petroleum hydrocarbons, polymerized olefins, ethers, refrigeration gases, dry-cleaning solvents, castor oil and its derivatives, methyl methacrylate resins and antioxidants, subject to oxidative deterioration accelerated by a catalytically active metal, having incorporated therein a small proportion, sufficient to inhibit the catalytic effect of the metal, of a dihydroxamic acid.

7. An organic substance of the group consisting of vegetable fats and oils, animal fats and oils, vitamins, soaps, rubber, linear super-polyamides, petroleum hydrocarbons, polymerized olefins, ethers, refrigeration gases, dry-cleaning solvents, castor oil and its derivatives, methyl methacrylate resins and antioxidants, subject to oxidative deterioration accelerated by a catalytically active metal, having incorporated therein a small proportion, sufficient to inhibit the catalytic effect of the metal, of an aliphatic dihydroxamic acid devoid of acid substituents and which consists of the elements carbon, hydrogen, oxygen and nitrogen.

8. An organic substance of the group consisting of vegetable fats and oils, animal fats and oils, vitamins, soaps, rubber, linear super-polyamides, petroleum hydrocarbons, polymerized olefins, ethers, refrigeration gases, dry-cleaning solvents, castor oil and its derivatives, methyl methacrylate resins and antioxidants, subject to oxidative deterioration accelerated by a catalytically active metal, having incorporated therein a small proportion, sufficient to inhibit the catalytic effect of the metal, of an aliphatic dihydroxamic acid which, except for the hydroxamic acid groups, consists of the elements carbon and hydrogen.

9. An organic substance of the group consisting of vegetable fats and oils, animal fats and oils, vitamins, soaps, rubber, linear super-polyamides, petroleum hydrocarbons, polymerized olefins, ethers, refrigeration gases, dry-cleaning solvents, castor oil and its derivatives, methyl methacrylate resins and antioxidants, subject to oxidative deterioration accelerated by a catalytically active metal, having incorporated therein a small proportion, sufficient to inhibit the catalytic effect of the metal, of adipodihydroxamic acid.

10. Non-viscous petroleum hydrocarbons, subject to oxidative deterioration accelerated by a catalytically active metal, having incorporated therein a small proportion, sufficient to inhibit the catalytic effect of the metal, of a hydroxamic acid.

11. Non-viscous petroleum hydrocarbons, subject to oxidative deterioration accelerated by a catalytically active metal, having incorporated therein a small proportion of a compound, normally effective to inhibit such deterioration in the absence of said catalytically active metal but which is materially less effective in the presence of said catalytically active metal, and a small proportion, sufficient to inhibit the catalytic effect of the metal, of a hydroxamic acid.

12. Non-viscous petroleum hydrocarbons, subject to oxidative deterioration accelerated by a catalytically active metal, having incorporated therein a small proportion of a compound, normally effective to inhibit such deterioration in the absence of said catalytically active metal but which is materially less effective in the presence of said catalytically active metal, and a small proportion, sufficient to inhibit the catalytic effect of the metal, of an aliphatic hydroxamic acid devoid of acid substituents.

13. A composition comprising a major proportion of a viscous hydrocarbon oil having incorporated therein a small proportion of an organic hydroxamic acid.

14. A composition comprising a major proportion of a viscous hydrocarbon oil having incorporated therein a small proportion of an organic hydroxamic acid containing at least 6 carbon atoms.

15. A composition comprising a major proportion of a viscous hydrocarbon oil having incorporated therein a small proportion of an organic hydroxamic acid, containing at least 6 carbon atoms and consisting of the elements carbon, hydrogen, oxygen and nitrogen, devoid of acid substituents.

16. A composition comprising a major proportion of a viscous hydrocarbon oil having incorporated therein a small proportion of an organic hydroxamic acid, containing at least 6 carbon atoms and, except for one to two

 groups consisting of carbon and hydrogen.

17. A composition comprising a major proportion of a viscous hydrocarbon oil having incorporated therein a small proportion of an aliphatic hydroxamic acid, containing at least 6 carbon atoms, devoid of acid substituents.

18. A composition comprising a major proportion of a viscous hydrocarbon oil having incorporated therein a small proportion of an aliphatic hydroxamic acid, containing at least 6 carbon atoms and consisting of the elements carbon, hydrogen, oxygen and nitrogen, devoid of acid substituents.

19. A composition comprising a major proportion of a viscous hydrocarbon oil having incorporated therein a small proportion of an aliphatic hydroxamic acid, containing at least 10 carbon atoms and, except for one

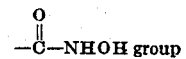 group consisting of carbon and hydrogen.

20. A composition comprising a major proportion of a viscous hydrocarbon oil having incorporated therein a small proportion of laurohydroxamic acid.

21. A composition comprising a major proportion of a viscous hydrocarbon oil having incorporated therein a small proportion of naphthenohydroxamic acids.

22. Non-viscous petroleum hydrocarbons, subject to oxidative deterioration accelerated by a catalytically active metal, having incorporated therein a small proportion of a compound, normally effective to inhibit such deterioration in the absence of said catalytically active metal but which is materially less effective in the presence of said catalytically active metal, and a small proportion, sufficient to inhibit the catalytic effect of the metal, of adipodihydroxamic acid.

MELVIN A. DIETRICH.